United States Patent
Adam

(10) Patent No.: US 6,376,062 B1
(45) Date of Patent: Apr. 23, 2002

(54) OVERLAY MATERIAL AND COMPOSITE MULTILAYER MATERIAL

(75) Inventor: Achim Adam, Nauheim (DE)

(73) Assignee: Federal-Mogul Wiesbaden GmbH & Co. KG (DE)

( * ) Notice: Subject to any disclaimer, the term of this patent is extended or adjusted under 35 U.S.C. 154(b) by 0 days.

(21) Appl. No.: 09/258,639

(22) Filed: Feb. 26, 1999

(30) Foreign Application Priority Data

Feb. 28, 1998 (DE) ........................... p 198 08 540

(51) Int. Cl.[7] .................................. B32B 5/16
(52) U.S. Cl. ................. 428/327; 428/421; 428/422
(58) Field of Search ................. 428/327, 421, 428/422

(56) References Cited

U.S. PATENT DOCUMENTS 5,474,842 A * 12/1995 Hoiness ........................ 428/327
5,911,514 A *  6/1999 Davies et al. ............... 384/300

FOREIGN PATENT DOCUMENTS

| DE | 3601568 A1 | 7/1987 | ........... C08L/27/18 |
| DE | 3601569 A1 | 7/1987 | ............... C08J/5/16 |
| DE | 389089 C1 | 1/1997 | ........... C08L/77/10 |
| GB | 2242240 A | 9/1991 | ........... F16C/33/12 |
| WO | WO97/03299 | 1/1997 | ........... F16C/33/20 |

* cited by examiner

Primary Examiner—Blaine Copenheaver
Assistant Examiner—Ula C. Ruddock
(74) Attorney, Agent, or Firm—Reising, Ethington, Barnes, Kisselle, Learman & McCulloch, PC

(57) ABSTRACT

An overlay material is described which extends the advantages of materials containing PTFE to the extent that they may be more heavily loaded without its being necessary to resort to the use of lead or lead compounds. The overlay material, which may comprise as its matrix material PTFE or PTFE combined with other fluorothermoplastics or a matrix material not comprising PTFE, contains at least one powder-form polyaramid, the content of which, based on the total amount of PTFE or of the mixture of PTFE and the other fluorothermoplastics and the polyaramid, amounts to 10–50 vol. %. A composite multilayer material is also described which comprises an overlay consisting of an overlay material of the above type.

10 Claims, 1 Drawing Sheet

OVERLAY MATERIAL AND COMPOSITE MULTILAYER MATERIAL

BACKGROUND OF THE INVENTION

1. Field of the Invention

This invention relates to plastics-based overlay materials, in particular for bearing bushes, and to use thereof and to a composite ultilayer material in which this overlay material is used.

2. Description of Related Art

Bearing materials with plastics-based overlays are known as single-layer, two-layer or three-layer composite materials: solid plastics bearings, bearings with an outer metallic backing and directly applied or adhered plastics, other such with internal wire cloths, as well as three-layer bearings of backing metal, a sintered porous metal layer and a covering layer formed on and in the pores. All these bearings are generally used in areas in which the use of lubricants is impossible or undesirable. For this reason, they must provide these lubricants themselves when in operation.

Multilayer materials differ from solid plastics materials, for example by a negligible tendency towards cold flow under load, by substantially better heat conductivity and, in connection therewith, by markedly higher possible pv values. However, solid plastics materials may also be advantageous in certain cases, e.g. for reasons of cost.

Among three-layer materials, it is possible to distinguish further between those with overlays based on fluorothermoplastics, such as PTFE, FEP etc., and those with overlays based on other plastics, such as PEEK for example. The latter two groups differ in their manner of operation: while, in the case of PTFE-based materials, the bronze intermediate layer is the "active" component of the overlay and acts like a filler, the other plastics materials use it only as an anchoring means. If there is sufficient affinity to the metal backing, these plastics materials permit the production of true two-layer materials, but they may also be applied with the aid of an adhesive. On the active overlay itself the thermoset or thermoplastics material then assumes the supporting role of the bronze.

Bearing materials of filled fluorothermoplastic films adhered to metal or other such materials with wire cloths incorporated in the plastics are also known, which may likewise be adhered to a metal backing or may also be used without a rigid metal backing.

For universal applicability and ease of production, the most advantageous materials are three-layer materials based on fluorothermoplastics such as PTFE, which also exhibit the highest performance and temperature-resistance. In the production process, homogeneous PTFE/filler pastes are produced by means of a plastics dispersion and the final composite material is produced by a concluding step comprising sintering of the PTFE subsequent to rolling thereof onto the backing material.

Some of the most commonly used fillers for such materials are lead and molybdenum disulphide, these materials providing virtually equal performance levels. These fillers may also be used in the presence of lubricants.

If a solution to constructional problems is sought using maintenance-free, space-saving plain bearings with a PTFE overlay, careful note must be taken of their upper loading limits, since, in the case of the above-mentioned materials comprising lead or $MoS_2$ alone, these have a pv value of less than 2 MPa m/s in the average load and speed range (0.5–100 MPa and 0.02–2 m/s).

It is known from DE 41 060 01 A1 and DE 195 066 84 A1 that the use of PbO as a filler may also result in higher performance materials, but the use of materials such as lead which may be potentially damaging to health is becoming increasingly unacceptable. In the food processing industry it is out of the question.

Although the possibility of using poly-(p-phenyleneterephthalamide) as a filler in self-lubricating PTFE-based bearing materials is often mentioned, it is used without exception in the form of fibres, such as in GB 2291879 A for example.

WO 95/02772 describes a special type of fibrillated fibre, which is incorporated into the PTFE matrix. The fibrous form causes problems with homogeneous incorporation into the PTFE matrix and necessitates corresponding special production devices. Moreover, such fibres exhibit the disadvantage that they contain inhalable particles and are suspected of being carcinogenic.

The fibres are incorporated into the matrix in the manner of irregular wickerwork and so reduce shattering and erosion of the otherwise soft PTFE matrix.

References to aramid fibres repeatedly occur, e.g. in WO 97/03299 or GB 21 77 099 A, as a neutral element in fibrous form which may be replaced by other fibres and is therefore clearly not essential to the achievement of any particular characteristic.

A fundamental reason for the suitability and use of such fibres is their exceptional mechanical characteristic values—very high tensile strength and modulus of elasticity—which find their basis in the particularly high degree of molecular orientation in the longitudinal direction of the fibres and the strong physical parallel linkage of the individual rigid molecular strands.

SUMMARY OF THE INVENTION

The object of the invention is to provide an overlay material which extends the above-mentioned advantages of materials containing PTFE to the effect that they may be more heavily loaded without its being necessary to resort to the use of lead or lead compounds.

This object is achieved according to the first variant of the invention by an overlay material which contains at least one powder-form polyaramid, the content of which, based on the total amount of PTFE (polytetrafluoroethylene) or of the mixture of PTFE and the other fluorothermoplastics and the polyaramid, amounts to 10–50 vol. %.

According to a second variant of the invention, this overlay material may be incorporated into a matrix material comprising a different plastics material from that mentioned above, wherein the content of the matrix material based on the total overlay material amounts to 60–95 vol. %. The matrix material may be polyphenylene sulfide (PPS), polyamide (PA), polyvinylidene fluoride (PVDF), polysulfone (PSU), polyethersulfone (PES), polyetherimide (PEI), polyether etherketone (PEEK) and/or polyimide (PI).

DETAILED DESCRIPTION OF THE PREFERRED EMBODIMENT

It has surprisingly been found that the addition of polyaramid powder, preferably of poly-(p-phenyleneterephthalamide) (PPTA) and/or poly-(p-benzamide) (PBA) is sufficient significantly to increase the wear resistance and load carrying capacity of materials with overlays comprising a PTFE-based solid lubricant composition.

It has proven possible to increase performance so much that pv values of over 4 MPa m/s may be achieved for the average load and speed range under lubricant-free conditions.

Investigation of the properties, for example of the two-component system PTFE/PPTA, has shown that the mixture must contain 10–50 vol. % PPTA and 50–90 vol. % PTFE to achieve said advantageous properties. Particularly advantageous properties are achieved if the mixture contains 10 to 30 vol. % PPTA. It was also possible to confirm these results for other polyaramids.

The particle size of the powder used may be 100 μm but is preferably <50 μm.

Ratios other than those according to the invention have proved unable to provide any substantial improvements in relation to the prior art. However, it is possible to use additional suitable components within the framework of the limits imposed on the polyaramid content, the polyaramid content preferably not falling below 10 vol. % based on the total amount of PTFE or the mixture of PTFE and the other fluorothermoplastics as well as the polyaramid and the further components. These further components may, for instance, comprise thermosets or high temperature thermoplastics, e.g. polyimides or polyamide imides, other solid lubricants, e.g. boron nitride or molybdenum sulphide, pigments, e.g. coke or iron oxide, fibrous materials, e.g. graphite or aramid fibres, or hard materials such as boron carbide or silicon nitride for example.

Suitable fluorothermoplastics whose melting point exceeds 260° C. for use in combination with PTFE are PFA (perfluoroalkoxy copolymer), tetrafluoroethylene-hexafluoropropylene copolymer (FEP) and/or tetrafluoroethylene propylene ether polymer (EPE) wherein the content thereof should be at most equal to that of PTFE.

A preferred use for the overlay material comprising a matrix material of a plastics material not comprising PTFE, into which PTFE or PTFE in combination with other fluorothermoplastics is incorporated, is as a solid plastics sliding element.

The composite multilayer material comprises at least a backing layer and an overlay according to the invention. The backing layer may be a metal backing to which a porous sintered layer is applied. The overlay material covers the sintered layer and fills the pores at least partially.

Such a three-layer material having an overlay according to the invention with a PTFE matrix material is, for example, constructed in such a way that a layer of bronze 0.05–0.5 mm thick is sintered onto the backing metal, such as steel or a copper or aluminium alloy for example, in such a manner that it exhibits a pore volume of 20–40% and the bronze composition itself contains 5–15% tin and optionally up to 15% lead. The plastics mixture is then rolled onto the porous backing in such a way that the pores are completely filled and an overlay 0–50 μm thick is obtained, depending on the use to which it is to be put. The material is subsequently subjected to heat treatment, during which the PTFE obtained is sintered to produce the finished composite and the necessary final dimensions in a concluding rolling step.

According to another embodiment, the backing layer may consist of a wire cloth or mesh which is cover ed with overlay material. The gaps in the cloth or mesh are filled at least partially with overlay material.

According to another embodiment, the overlay material comprising a matrix material of a plastics material pot comprising PFTE, into which PTFE or PTFE in combination with other fluorothermoplastics is incorporated, may also be applied directly to the backing layer.

BRIEF DESCRIPTION OF THE DRAWINGS

Exemplary embodiments of the invention are described in more detail below with the aid of the tables and drawings, in which.

The plastics mixture may be produced using a PTFE dispersion into which the fillers are mixed in such a way that they are included in the subsequent coagulation in homogeneously dispersed manner. A pasty composition is produced which exhibits the characteristics required for the subsequent coating process.

Production of the plastics mixtures comprising PTFE polytetrafluoroethylene matrix material:

10 liters water, 25 g sodium lauryl sulphate, the amounts of PPTA powder and other components appropriate to the composition and 34 kg of a 35% PTFE dispersion are stirred energetically for 20 mins. 1 kg of a 20% aluminium nitrate solution is then added. After coagulation, 1 l toluene is stirred into the mixture and the emergent liquid is removed.

All the above-mentioned examples from the group comprising three-layer systems having a PTFE matrix overlay may be produced in this way. Therefore, only the compositions of the plastics mixtures are mentioned below.

The overlay materials in the compositions according to the invention are markedly superior to PTFE/MOS$_2$- or PTFE/Pb-based standard materials both from the point of view of the coefficient of friction and that of wear resistance.

The PTFE and PPTA compositions were varied and samples of the above-described three-layer materials were produced which comprised 1.25 mm of steel, 0.23 mm of bronze and 0.02 mm of plastics overlay. Using a pin-on-disc tribometer and 0.78 cm$^2$ test pieces, the wear rates were measured for these samples at a peripheral speed of 0.52 m/s and under a 17.5 MPa load and compared with a standard material. The material taken as standard was a composite multilayer material having a plastics overlay comprising 80 vol. % PTFE and 20 vol. % Pb.

Figure 2:
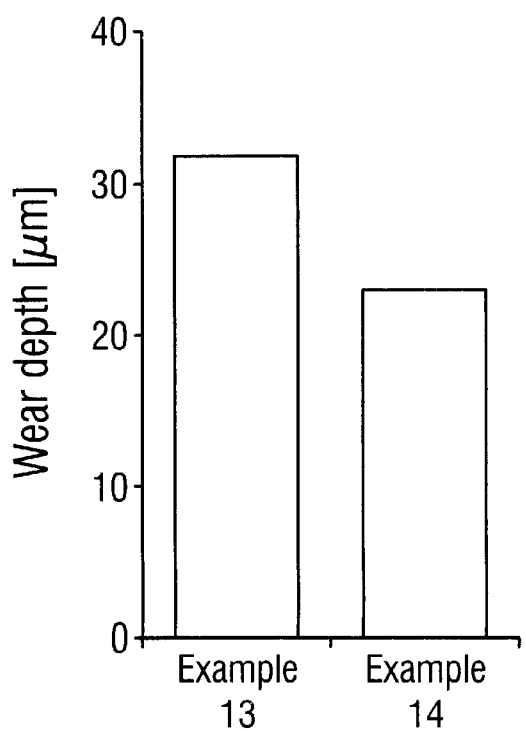
FIG. 2 is a wear depth diagram relating to Examples 13 and 14.

To illustrate clearly the improvements which may be achieved according to the invention, the material compositions listed in Table 1 together with the coefficients of friction and wear rates resulting from the pin-on-disc test were tested. FIG. 2 compares graphically the results obtained with and without PPTA, which prove that materials comprising PPTA are better in every case.

The results obtained for the exemplary compositions 7–11 and compared in Table 2 show that the overlay materials according to the invention may also be combined with further components without losing the positive characteristics. Indeed, the addition of such materials makes it possible to achieve further improvements.

In addition, the efficiency of poly-(p-benzamide) was tested. The corresponding pin-on-disc test result is given in Table 3. It is clear that materials which are similar in structure to PPTA are also capable of bringing about the effect according to the invention.

Bushes 22 mm in diameter were produced from exemplary compositions nos. 2, 7 and 14 and tested for their limit load carrying capacity in a rotating test. The limit load was defined as being the highest load with which a distance of 13.5 km could be covered at a speed of 0.075 m/s. The failure criterion was a sharp increase in temperature.

Figure 1:
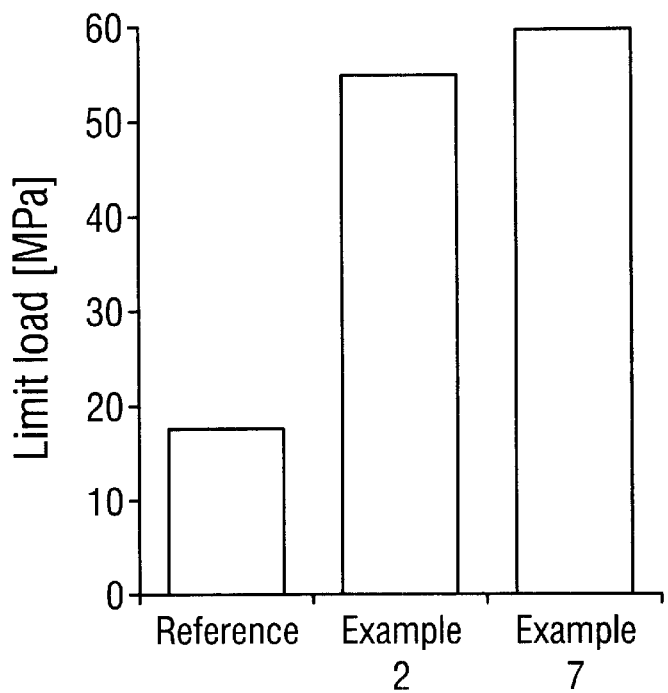
FIG. 1 is a load limit diagram comparing Examples 2 and 7 with a reference material.

Using different evaluations, the results of Examples 2 and 7 correspond to pv values of 4 or 4.5 MPa m/s and are compared with the reference material in FIG. 1.

Under the same test conditions, FIG. 2 compares Example 14 and a variant having a thermoplastic matrix of a comparable composition without polyaramid powder (Example 13). Wear was evaluated after 50 hours under a 60 MPa load. The positive influence of the additive according to the invention is also visible here.

Instead of being incorporated into a porous sintered framework applied to a metal backing, the compositions according to the invention may also be incorporated into a metal cloth or mesh, whereby a thin-walled film material is obtained.

In addition to unlubricated use, use is also possible in hydraulic systems, for example as rod guidance bushes in shock absorbers. When used in this way, wear coefficients were noted which were better than those of the standard material with PTFE/Pb overlay. This is shown in Table 4 together with the coefficients of friction. The basis for the table is a 30 hour test programme, based on a ramp function with 80 mm lift and a frequency of 0.5 Hz. The coefficients of friction were determined using shock absorber piston rods under a 1000 N load, operating at 20 mm/s and with drip feed lubrication.

Another possible advantageous embodiment of the invention consists in incorporating the PTFE mixtures according to the invention into a thermoplastic matrix and then processing the latter in any desired manner to produce a sliding element, e.g. by applying it to a metal backing with or without a bronze intermediate layer or producing solid plastics parts. The thermoplastic content may range from 60–95 vol. %, preferably 70–90 vol. %.

By way of example, the composition filled with the PTFE/PPTA mixture according to the invention was mixed as a powder, scattered onto a steel/bronze backing, melted and rolled on. However, it is also possible to produce the mixtures by melt compounding. The effect on the tribological properties of a PPS compound may serve as an example of this, but many other thermoplastics, such as PES, PA, PVDF, PSU, PEEK, PEI etc., or thermosets may be used as the matrix. To illustrate clearly the effect according to the invention, Table 5 contains the coefficients of friction and wear of PPS compounds comprising PTFE and PTFE/PPTA, which were determined under the test conditions described above in relation to bearing bushes. The precise compositions and measured values are likewise revealed in Table 5.

Obviously, many modifications and variations of the present invention are possible in light of the above teachings. It is, therefore, to be understood that within the scope of the appended claims, the invention may be practiced otherwise than as specifically described.

TABLE 1

| Ex. No. | Composition, vol. % | Wear [μm] | Coefficient of friction |
| --- | --- | --- | --- |
| 0 Reference | PTFE 80, Pb 20 | 105 | 0.21 |
| 2 | PTFE 70, PPTA 30 | 13 | 0.17 |
| 3 | PTFE 75, PPTA 25 | 25 | 0.16 |
| 4 | PTFE 80, PPTA 20 | 25 | 0.18 |
| 5 | PTFE 85, PPTA 15 | 38 | 0.20 |

TABLE 2

| Ex. No. | Composition, vol. % | Wear [μm] | Coefficient of friction |
| --- | --- | --- | --- |
| 2 (for comparison) | PTFE 70, PPTA 30 | 13 | 0.17 |
| 6 | PTFE 70, PPTA 20, $MoS_2$ 10 | 12 | 0.16 |
| 7 | PTFE 70, PPTA 20, $MoS_2$ 5, BN 5 | 10 | 0.18 |
| 8 | PTFE 70, PPTA 25, $Fe_2O_3$ 5 | 19 | 0.18 |
| 9 | PTFE 70, PPTA 25, $Si_3N_4$ 5 | 25 | 0.16 |
| 10 | PTFE 70, PPTA 25, C fibre 5 | 50 | 0.21 |
| 11 | PTFE 70, PPTA 25, PI 5 | 8 | 0.19 |

TABLE 3

| Ex. No. | Composition, vol. % | Wear [μm] | Coefficient of friction |
| --- | --- | --- | --- |
| 2 (for comparison) | PTFE 70, PPTA 30 | 13 | 0.17 |
| 12 | PTFE 70, PBA 30 | 16 | 0.19 |

TABLE 4

| Ex. No. | Composition, vol. % | Wear [μm] | Coefficient of friction |
| --- | --- | --- | --- |
| 0 Reference | PTFE 80, Pb 20 | 45 | 0.023 |
| 2 | PTFE 70, PPTA 30 | 15 | 0.028 |
| 7 | PTFE 70, PPTA 20, $MoS_2$ 5, BN 5 | 12 | 0.021 |

TABLE 5

| Ex. No. | Composition, vol. % | Wear [μm] | Coefficient of friction |
| --- | --- | --- | --- |
| 13 | PPS 80, PTFE 20 | 17 | 0.20 |
| 14 | PPS 80, PTFE 15, PPTA 5 | 10 | 0.17 |
| 15 | PPS 80, PTFE 15, PBA 5 | 12 | 0.17 |
| 16 | PA 11 80, PTFE 20 | 17 | 0.16 |
| 17 | PA 11 80, PTFE 15, PPTA 5 | 7 | 0.16 |

What is claimed is:

1. An overlay material for bearing bushes comprising:
   a major component of non-polytetrafluoroethylene (non-PTFE) material which is the matrix of the overlay material and amounts to 60 to 95 vol. % of the total overlay material;
   a minor component that amounts to 5 to 40 vol. % of the total overlay material, said minor component comprising:
   a first fluorothermoplastic additive selected from the group consisting of:
   PTFE or
   a mixture of PTFE and other fluorothermoplastic material having a melting point of over 260° C., and
   a second additive of at least one powder-form polyaramid, wherein the second additive amounts to 10 to 50 vol. % of the total additives.

2. The overlay material of claim 1 wherein said major component of non-PTFE material comprises at least one material selected from the group consisting of: polyphenylene sulfide (PPS), polyamide (PA), polyvinylidene fluoride (PVDF), polysulfone (PSU), polyethersulfone (PES), polyetherimide (PEI), polyether etherketone (PEEK) and/or polyimide (PI).

3. The overlay material of claim 2 wherein the polyaramid is present in the amount of 10–30 vol. %.

4. The overlay material of claim 3 wherein said polyaramid comprises at least one material selected from the group consisting of poly-(p-phenyleneterephthalamide) and poly-(p-benzamide).

5. The overlay material of claim 4 wherein the polyaramid powder has a particle size <100 μm.

6. The overlay material of claim 5 wherein said particle size of the polyaramid powder is <50 μm.

7. The overlay material of claim 5 wherein said other fluorothermoplastic material is selected from a group consisting of perfluoroalkoxy copolymer (PFA), tetrafluoroethylene-hexafluoropropylene copolymer (FEP), and tetrafluoroethylene propylene ether polymer (EPE), said other fluorothermoplastic additive having a vol. % content that is at most equal to that of said polytetrafluoroethylene (PTFE).

8. The overlay material of claim 7 wherein some of the polyaramid is replaced by further components, the polyaramid content not falling below 10 vol. % based on the total amount of said fluorothermoplastic and said polyaramid additives and such further said components.

9. The overlay material of claim 8 wherein said further components comprise at least one material selected from the group consisting of hard materials, pigments, fibrous materials, solid lubricants, thermosets and high temperature thermoplastics.

10. A composite multilayer material comprising a backing layer and an overlay of an overlay material according to claim 1, characterized in that the overlay material is applied directly to the backing layer.

* * * * *